(12) United States Patent
Dai et al.

(10) Patent No.: US 9,697,592 B1
(45) Date of Patent: Jul. 4, 2017

(54) COMPUTATIONAL-COMPLEXITY ADAPTIVE METHOD AND SYSTEM FOR TRANSFERRING LOW DYNAMIC RANGE IMAGE TO HIGH DYNAMIC RANGE IMAGE

(71) Applicant: TCL RESEARCH AMERICA INC., San Jose, CA (US)

(72) Inventors: Qiqin Dai, San Jose, CA (US); Xiaobo Ren, San Jose, CA (US); Haohong Wang, San Jose, CA (US)

(73) Assignee: TCL RESEARCH AMERICA INC., San Jose, CA (US)

(*) Notice: Subject to any disclaimer, the term of this patent is extended or adjusted under 35 U.S.C. 154(b) by 43 days.

(21) Appl. No.: 14/984,466

(22) Filed: Dec. 30, 2015

(51) Int. Cl.
| | |
|---|---|
| *G06T 5/00* | (2006.01) |
| *G06K 9/46* | (2006.01) |
| *G06T 3/00* | (2006.01) |
| *G06T 7/40* | (2017.01) |
| *G06K 9/62* | (2006.01) |
| *G06K 9/00* | (2006.01) |

(52) U.S. Cl.
CPC .......... *G06T 5/009* (2013.01); *G06K 9/00979* (2013.01); *G06K 9/4671* (2013.01); *G06K 9/6214* (2013.01); *G06K 9/6223* (2013.01); *G06T 3/0093* (2013.01); *G06T 7/40* (2013.01); *G06T 5/007* (2013.01); *G06T 2207/20208* (2013.01); *G06T 2207/20221* (2013.01)

(58) Field of Classification Search
CPC ......... G06T 3/0093; G06T 5/009; G06T 7/40; G06T 2207/20208; G06T 2207/20221; G06K 9/00979; G06K 9/4671; G06K 9/6214; G06K 9/6223
See application file for complete search history.

(56) References Cited

U.S. PATENT DOCUMENTS

| | | | |
|---|---|---|---|
| 2011/0188744 A1* | 8/2011 | Sun .......................... | G06T 5/50 382/162 |
| 2011/0229029 A1* | 9/2011 | Kass ...................... | G06T 5/002 382/168 |

(Continued)

OTHER PUBLICATIONS

Jain et al. ("InternetHDR: Enhancing an LDR image using visually similar Internet images," Twentieth National Conference on Communications (NCC), Feb. 28-Mar. 2, 2014).*

(Continued)

*Primary Examiner* — Yubin Hung
(74) *Attorney, Agent, or Firm* — Anova Law Group, PLLC (57) ABSTRACT

The present invention provides a method for converting a low dynamic range (LDR) image to a high dynamic range (HDR) image, including obtaining an input LDR image; and in an HDR image database, selecting one or more HDR images that match the input LDR image as candidate images. Further, the candidate images are warped according to a spatial correspondence between the candidate images and the input LDR image. The input LDR image is decomposed to an illumination component and a texture component. The illumination component and the texture component are reconstructed respectively based on the warped candidate images. The reconstructed illumination component and the reconstructed texture component are combined to produce an output HDR image.

20 Claims, 6 Drawing Sheets

(56) References Cited

U.S. PATENT DOCUMENTS

| | | | | |
|---|---|---|---|---|
| 2012/0201456 A1* | 8/2012 | El-Mahdy | ............... | G06T 5/009 |
| | | | | 382/167 |
| 2012/0288217 A1* | 11/2012 | Zhai | ................. | G06T 5/50 |
| | | | | 382/294 |
| 2013/0108183 A1* | 5/2013 | Bruls | ................ | G06T 9/004 |
| | | | | 382/233 |
| 2016/0292824 A1* | 10/2016 | Li | ..................... | G06T 5/002 |

OTHER PUBLICATIONS

Shanmuganathan et al. ("Poisson Compositing," Proceeding ACM SIGGRAPH Asia 2009, Dec. 16-19, 2009).*

Jung et al. ("High dynamic range imaging on mobile devices using fusion of multiexposure images," Opt. Eng. 52(10), 102004, Jun 17, 2013).*

Park et al. ("High dynamic range image acquisition using multiple images with different apertures," Opt. Eng. 51(12), Dec. 11, 2012).*

Wang et al. ("Low visual difference virtual high dynamic range image synthesizer from a single legacy image," 18th IEEE International Conference on Image Processing (ICIP), Sep. 11-14, 2011).*

* cited by examiner

Origin image

FIG. 6A

Illumination component

FIG. 6B

Texture component

COMPUTATIONAL-COMPLEXITY ADAPTIVE METHOD AND SYSTEM FOR TRANSFERRING LOW DYNAMIC RANGE IMAGE TO HIGH DYNAMIC RANGE IMAGE

FIELD OF THE DISCLOSURE

The present disclosure relates to the field of image processing technologies and, more particularly, relates to a method and system for transferring low dynamic range (LDR) image to high dynamic range (HDR) image.

BACKGROUND

Transferring images from LDR to HDR has become of a new topic in image processing area. With the development of HDR display devices, the dynamic range of the display is getting larger. However, most image contents nowadays are in LDR, because the dynamic range of traditional camera is narrow. With the popularity of HDR display devices, there is an avid demand for transferring LDR images into HDR images to achieve a desired display effect on HDR screens.

Among existing technologies, traditional inverse tone mapping methods only expand the illumination range while do not recover the saturated information in the over-exposure region. The HDR image hallucination methods can recover the saturated information in the over-exposure region by the self-similarity assumption. However, such assumption usually does not hold, making the performance of the methods questionable. Further, the hallucination method needs user interaction to manually decide the over-exposure region and its corresponding self-similarity region, making the method impractical in industry.

The disclosed method and system are directed to solve one or more problems set forth above and other problems.

BRIEF SUMMARY OF THE DISCLOSURE

One aspect of the present disclosure provides a method for converting a low dynamic range (LDR) image to a high dynamic range (HDR) image, including obtaining an input LDR image; and in an HDR image database, selecting one or more HDR images that match the input LDR image as candidate images. Further, the candidate images are warped according to a spatial correspondence between the candidate images and the input LDR image. The input LDR image is decomposed to an illumination component and a texture component. The illumination component and the texture component are reconstructed respectively based on the warped candidate images. The reconstructed illumination component and the reconstructed texture component are combined to produce an output HDR image.

Another aspect of the present disclosure provides a system for converting a LDR image to a HDR image, including an HDR image database containing a plurality of HDR images; and one or more processors. The one or more processors may be configured to obtain an input LDR image; select, from the HDR image database, one or more HDR images that matches the input LDR image as candidate images; warp the candidate images according to a spatial correspondence between the candidate images and the input LDR image; and decompose the input LDR image to an illumination component and a texture component. The one or more processors may further be configured to respectively reconstruct the illumination component and the texture component based on the warped candidate images; and combine the reconstructed illumination component and the reconstructed texture component to produce an output HDR image.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to the drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

Figure 1:
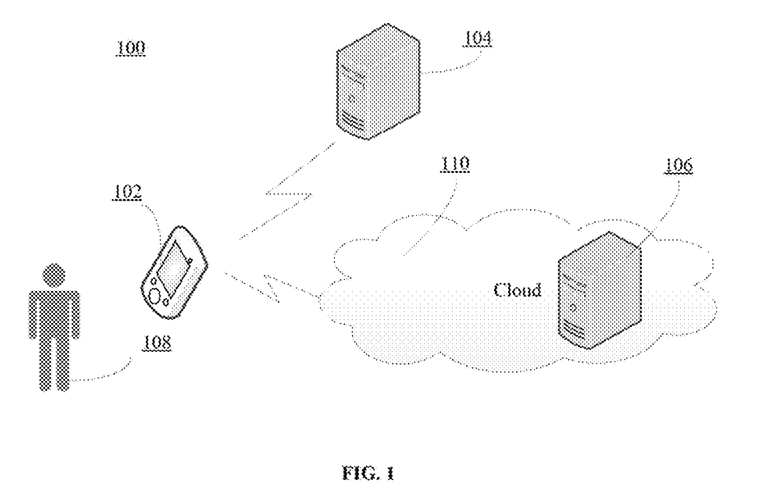
FIG. 1 illustrates an exemplary environment incorporating certain embodiments of the present invention.

FIG. 1 illustrates an exemplary environment 100 incorporating certain disclosed embodiments. As shown in FIG. 1, environment 100 may include a terminal 102, a server 104, a cloud 110, a server 106, and a user 108. Certain device(s) may be omitted and other devices may be added. A user 108 may operate terminal 102 for certain services provided by server 104. Although only two servers 104/106 and one terminal 102 is shown in the environment 100, any number of terminals 102 or servers 104/106 may be included, and other devices may also be included.

Terminal 102 may refer to any appropriate user terminal with certain computing capabilities, such as a personal computer (PC), a work station computer, a server computer, a hand-held computing device (tablet), a smart phone or mobile phone, or any other user-side computing device. Terminal 102 may capture, process and display images.

Server 104 and server 106 may include any appropriate type of one or more server computers configured to provide server functionalities, which may require any user accessing the services to authenticate to the server before the access, such as data query and image processing services. Server 104 and server 106 may also include one or more processors to execute computer programs in parallel. Server 104 and server 106 may store data (e.g., an image database) to be accessed by the mobile terminals and other computation applications.

Although server 104 or server 106 is shown in a single computer configuration, more computers or server clusters can be included in server 104 or server 106. Server 104 and server 106 may have similar functionalities and may be present at the same time or may be present one without the other.

Cloud 110 may refer to a cloud computing environment, i.e., the use of computing resources (hardware and software) that are delivered as a service over a network infrastructure (e.g., the Internet). Cloud 110 may include any private cloud configuration and/or public cloud configuration. Cloud 110 may include various servers (i.e., server services), such as a server 106 configured to provide image storage and computation functionalities. Any appropriate types of servers may be included.

Cloud-based services in cloud 110 may be delivered to terminal 102 via data connections, such as 3G, 4G-LTE and WiFi networks. Data collected on terminal 102 may be forwarded to cloud 110 (e.g., server 106 in cloud 110) as input data to various services provided by server 106. For example, the data collected on terminal 102 may include image data, and the image data may be forwarded to server 106 as input data.

Terminal 102, server 104 and server 106 or among multiple terminals 102 and servers 104 may communicate with each other through any appropriate type of communication network, such as the Internet or other types of computer networks or telecommunication networks, either wired or wireless, such as a cable network, a phone network, and/or a satellite network, etc.

Figure 2:
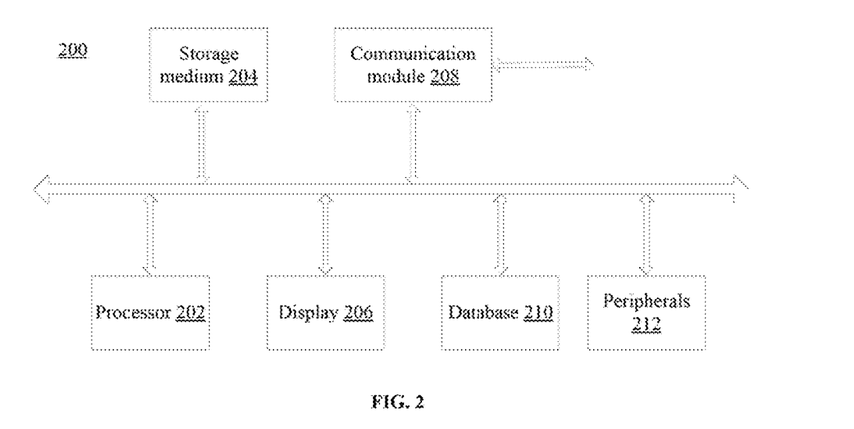
FIG. 2 illustrates an exemplary computing system consistent with the disclosed embodiments.

Terminal 102, server 104 or server 106 may be implemented on any appropriate computing platform. FIG. 2 shows a block diagram of an exemplary computing system 200 capable of implementing terminal 102, server 104 and/or server 106.

As shown in FIG. 2, computer system 200 may include a processor 202, a storage medium 204, a display 206, a communication module 208, a database 210, and peripherals 212. Certain devices may be omitted and other devices may be included.

Processor 202 may include any appropriate processor or processors. Further, processor 202 can include multiple cores for multi-thread or parallel processing. Processor 202 may execute sequences of computer program instructions to perform various processes, such as an image processing program. Storage medium 204 may include memory modules, such as ROM, RAM, flash memory modules, and erasable and rewritable memory, and mass storages, such as CD-ROM, U-disk, and hard disk, etc. Storage medium 204 may store computer programs for implementing various processes, when executed by processor 202.

Further, communication module 208 may include network devices for establishing connections through the network 106. Database 210 may include one or more databases for storing certain data (e.g., image data) and for performing certain operations on the stored data, such as database searching and data retrieving.

Display 206 may include any appropriate type of computer display device or electronic device display (e.g., CRT or LCD based devices, touch screens). Peripherals 212 may include I/O devices, such as camera, keyboard and mouse.

Figure 3:
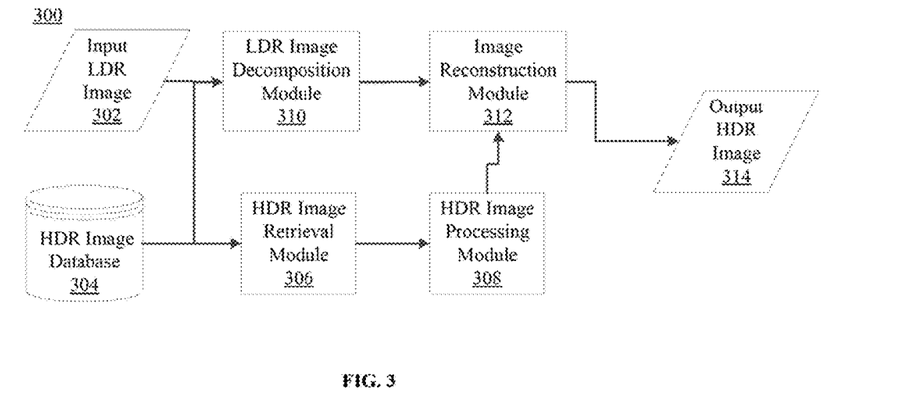
FIG. 3 illustrates an exemplary system for converting an LDR image to an HDR image consistent with the disclosed embodiments.

In operation, terminal 102, server 104 and/or server 106 may automatically transferring an image from low dynamic range (LDR) to high dynamic range (HDR) image based on an HDR image database. FIG. 3 illustrates an exemplary system for converting an LDR image to an HDR image consistent with the disclosed embodiments.

Dynamic range, as used herein, may refer to a ratio between the brightest and darkest parts of a scene. A low dynamic range (LDR) image may refer to images with ratios lower than 255:1, such as a JPEG image having 8-bit per color channel. A high dynamic range (HDR) image may store pixel values that span the whole tonal range of real-world scenes, such as 32-bit per color channel.

Equation (1) shows a degradation model relating an HDR image $I^h$ to an LDR image $I^l$. The 8-bits color depth LDR image is produced using equation (1) applied separately to the R, G, B channels.

$$I^l = \max\{0, \min\{1, \lfloor 255 \cdot (I^h \cdot \Delta t + e(I^h))^{1/\gamma} \rfloor / 255\}\} \quad (1)$$

In equation (1), the noise term $e(I^h)$ may be obtained by $e(I^h) = \sqrt{a \cdot \sigma(I^h)} + b \cdot \eta$, where $\eta$ is standard Gaussian noise and $\eta \sim N(0,1)$, a and b are parameters control noise level, and $\sigma(I^h)$ is the standard deviation of $I^h$. Further, in equation (1), $\Delta t$ is the exposure time, $\gamma$ is the gamma correction parameter, and $\lfloor \cdot \rfloor$ bracket denotes the rounding to the nearest smaller integer. The original HDR image $I^h$ is in scale $[0, \infty)$, recording the true illumination information of the scene, and the LDR image is compressed and clipped into scale.

The exemplary system 300 may use the LDR image as an input and transfers the LDR image to an HDR image. The exemplary system 300 may recover the saturated information in over-exposure regions, which is clipped because of the upper bound of the dynamic range. The exemplary system 300 may also expand the illumination range to fit the HDR display.

As shown in FIG. 3, the exemplary system 300 may include an HDR image database 304, an HDR image retrieval module 306, an HDR image processing module 308, an LDR image decomposition module 310, and an image reconstruction module 312.

In operation, given an input LDR image 302, the HDR image retrieval module 306 may be configured to search the HDR image database to retrieve the closest K HDR images as HDR candidate images. The HDR image processing module 308 may be configured to find spatial correspondence between the HDR candidate images and the given LDR input image 302 (e.g., image $I^l$ in equation (1)). In some embodiments, scale-invariant feature transform (SIFT) flow scene registration may be applied to find the spatial correspondence.

Further, the LDR image decomposition module 310 may be configured to decompose the LDR input image 302 into edge-preserving low frequency illumination component and high frequency texture component. In some embodiments, bilateral filter may be applied for the decomposition.

With the decomposed illumination and texture components of the LDR input image 302, the image reconstruction module 312 may be configured to reconstruct the illumination component and the texture component individually based on the candidate images, and combine the reconstructed illumination and texture components to produce the output HDR image 314.

In some embodiments, the image reconstruction module 312 may reconstruct the illumination component of saturated over-exposure region by global optimization, utilizing the illumination information of its corresponding regions in the HDR candidate images. The reconstructed illumination region may be consistent to illumination of its corresponding HDR candidate images and illumination prior estimated by Gaussian kernel fitting and may be spatial smooth. Inverse tone mapping techniques may be applied to expand the illumination range after recovering the illumination information of the over-exposure region.

In some embodiments, the image reconstruction module 312 may reconstruct the texture component of the saturated region by constrained texture synthesis to fill in those saturated region. The texton may be collected from the corresponding region in the HDR candidate images.

Further, the image reconstruction module 312 may combine the recovered illumination and texture components to obtain the final reconstructed HDR image.

The system 300 for transferring images from LDR to HDR may utilize techniques such as image retrieval, SIFT flow scene registration, image decomposition and texture synthesis. The system 300 may create HDR images with enhanced low frequency illumination component and more detailed high frequency textures component in the saturated over-exposure regions. The system 300 may be computational flexible by applying cloud computation and multiple scale image processing procedure.

Figure 4:
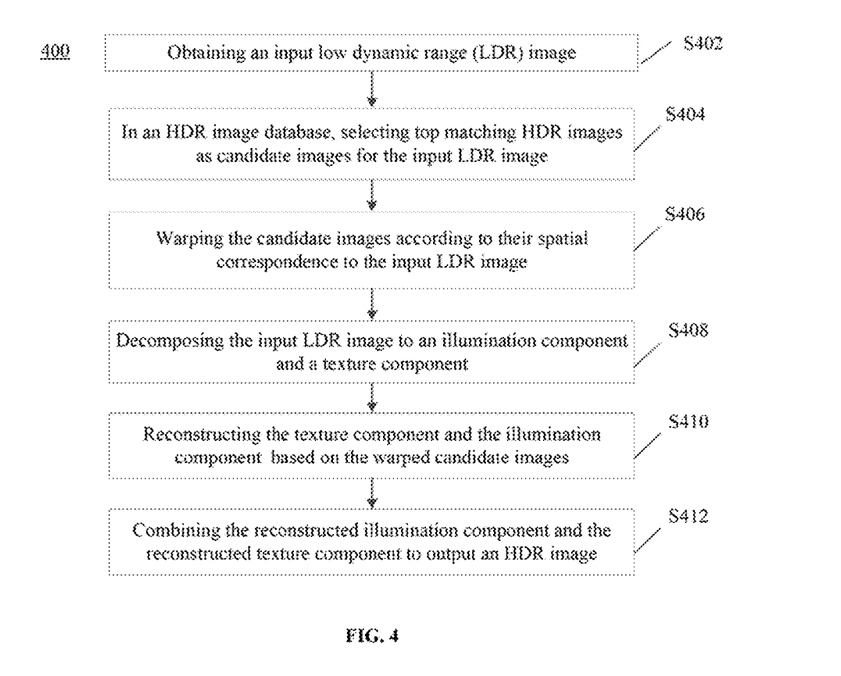
FIG. 4 illustrates an exemplary process for converting an LDR image to an HDR image consistent with the disclosed embodiments.

FIG. 4 illustrates an exemplary process for converting an LDR image to an HDR image consistent with the disclosed embodiments. As shown in FIG. 4, an input LDR image (e.g., input LDR image 302) may be obtained (S402). For example, the input LDR image may be an image captured by a camera, a locally-stored image, or an online image obtained by a user device (e.g., terminal 102 or server 104).

Given the input LDR image, a database may be searched to find top matching HDR images as candidate images (S404). The database (e.g., HDR image database 304) may include a plurality of HDR images stored on a terminal (e.g., terminal 102) and/or a server (e.g., server 104 or server 106 in cloud 110). The HDR images may be collected from various public HDR image databases or other resources. More HDR images may be added into the database to cover more scenery and improve the performance. In some embodiments, each HDR image in the database may be down sampled with different scale factors and stored at multiple resolutions. Further, dynamic range independent features of each image at different resolutions may also be pre-computed and stored in the database.

Given an HDR image database and an input LDR image, high-level image features with dynamic range independent property (such as GIST features) for each HDR image in the database as well as the input LDR image are computed and compared. Further, top K matching HDR images from the database may be selected (S404). These K matching HDR images may be referred to as candidate images. In some embodiments, k-Nearest Neighbors (kNN) algorithm may be implemented to find the top K matching HDR images based on the computed features.

Further, the candidate images may be processed according to estimated spatial correspondence between the candidate images and the input LDR image (S406). In some embodiments, pixel-to-pixel correspondence may be estimated through scale-invariant feature transform (SIFT) flow scene registration, which matches per-pixel SIFT features to estimate dense scene alignment. Since SIFT feature is not illumination invariant, each HDR candidate image may be degraded to LDR image according to Equation (1), with exposure time Δt obtained from equation (2):

$$\Delta t_i = \text{median}_x(I^l(x)/I_i^h(x)), \quad (2)$$

where x is the pixel index, $I^l$ is the input LDR image and $I_i^h$ is the $i^{th}$ retrieved HDR candidate image.

Figure 5:
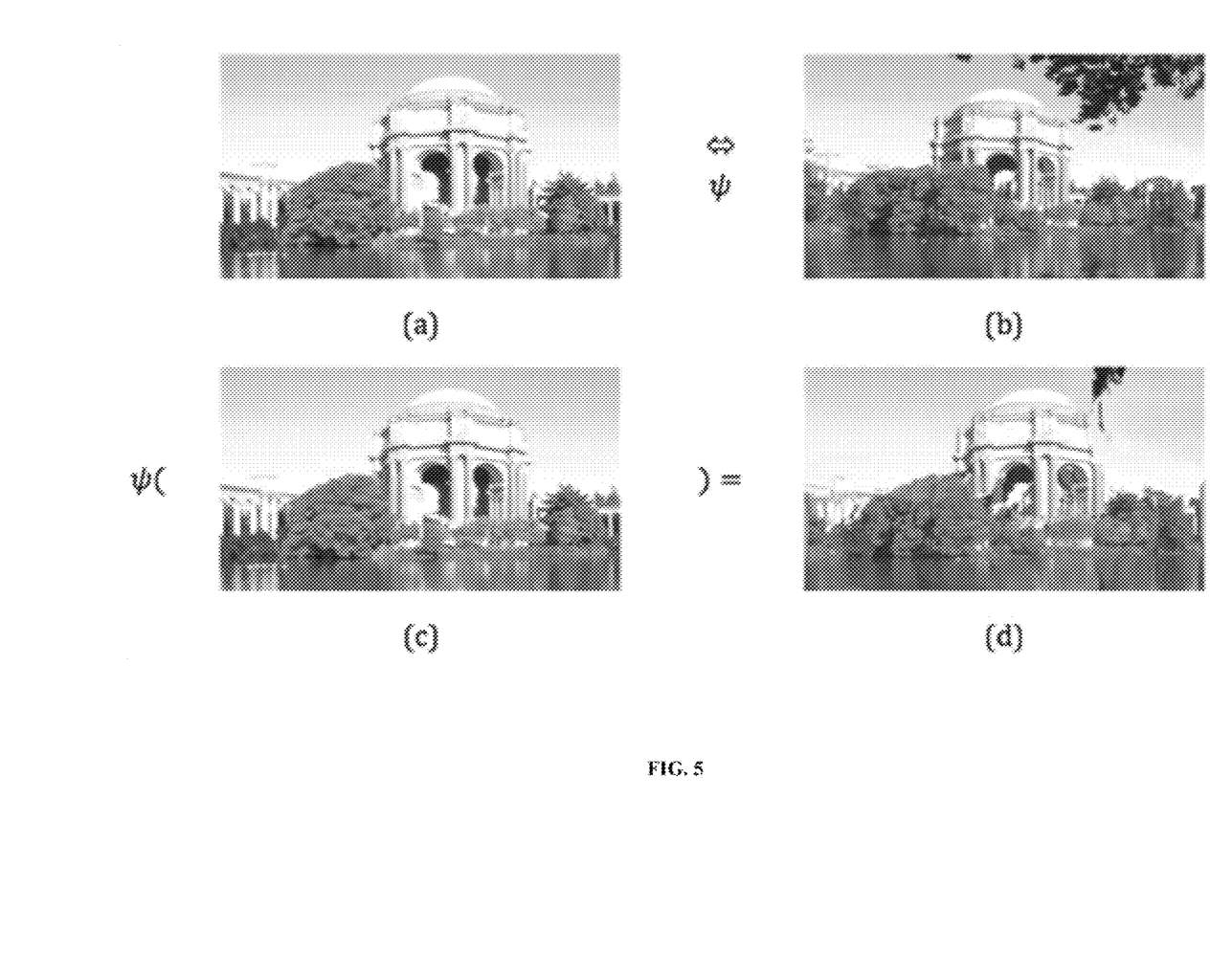
FIG. 5 illustrates an exemplary image warping process consistent with the disclosed embodiments.

Further, SIFT flow warping between the input LDR image and degraded HDR candidate image may be estimated. Using SIFT flow scene registration, warping functions denoted as $\psi_i$, $i \in \{1, \ldots, K\}$ may warp each degraded HDR candidate image to input LDR image. FIG. 5 illustrate an exemplary image warping process consistent with the disclosed embodiments.

As shown in FIG. 5, image (a) is a degraded HDR candidate image from the HDR image database and image (b) is the input LDR image. A warping function $\psi$ between images (a) and (b) may be estimated. Further, the estimated $\psi$ may be applied to achieve dense scene alignment. Image (c) is the same degraded HDR candidate image (a), and image (d) is a warped image after applying the warping function $\psi$ to image (c). It should be noted that the warped image (d) has similar structure as the original image (b).

The warping function may map pixel locations from the domain of a given degraded HDR candidate to pixel locations in the domain of the LDR input image. The warping functions can be one-to-many, meaning one warping function may be applied to a plurality of degraded HDR candidate images.

Returning to FIG. 4, the input LDR image may be decomposed into the edge preserving low frequency illumination component L and the high frequency texture component H (S408). In some embodiments, bilateral filter may be applied on the input LDR image $I^l$ to obtain the illumination component L. Further, provided that x is the image pixel index, element wise division may extract the texture component using equation (3).

$$H(x) = I^l(x)/L(x) \quad (3)$$

Figure 6A:
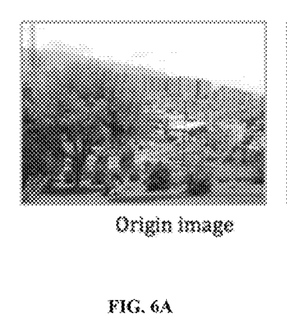
FIGS. 6A to 6C illustrates an exemplary decomposition result consistent with discloses embodiments.
Figure 6B:
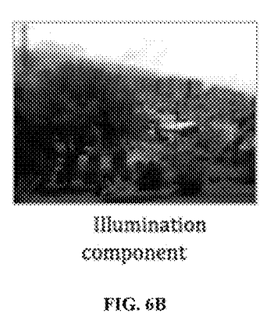
Figure 6C:
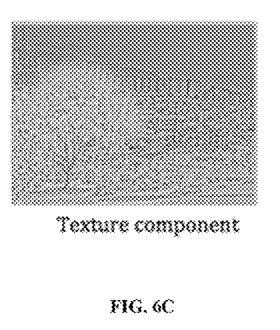

With the illumination and texture decomposition, the texture component is independent from the illumination variation, thus the sum of square distance (SSD) between image patches may be utilized to compute the similarity of patches in texture. An image patch, as used herein, may refer to a region in an image formed by multiple connected pixels (e.g., an N*N square region). FIGS. 6A to 6C illustrate an exemplary decomposition result consistent with discloses embodiments.

As shown in the FIGS. 6A to 6C, an original image FIG. 6A (i.e., the input LDR image) may be decomposed to illumination component FIG. 6B and texture component FIG. 6C.

In some embodiments, other algorithms that approximate bilateral filter may be applied for image decomposition, such as fast bilateral filtering using trigonometric range kernels, or a fast approximation of the bilateral filter using a signal processing approach. By using these techniques, the speed of decomposition process may be improved.

Returning to FIG. 4, the decomposed illumination component and the decomposed texture component may be reconstructed respectively (S410). Further, the decomposition step may include detecting over-exposure region in the LDR input image (S4102), reconstructing the illumination component based on the candidate images (S4104), and reconstructing the texture component based on the candidate images (S4106).

After obtaining the illumination component from the original LDR input image, over-exposure regions in the LDR input image may be detected (S4102). The over-exposure detection problem may be formulated as a classification problem. Each pixel is classified into two classes based on a grayscale threshold (e.g., a grayscale level representing white, such as 255 in an image with 256 grayscale levels): over-exposure region and correct exposure region.

In some embodiments, a global optimization may be implemented to recover the illumination information in the over-exposure region (S4104). Provided that $L^l$ denotes illumination component of the input LDR image, $L^h$ denotes the HDR illumination of the candidate images to be inferred, and $P(L^h|L^l)$ denotes the conditional probability of the HDR candidate image given the illumination component of the input LDR image, equation (4) may be minimized:

$$-\log(P(L^h|L^l))=E(L^h)=\Sigma i\epsilon \text{pixels}\alpha E_t(L_i^h)+\beta E_s(L_i^h)+E_p(L_i^h)+\log(Z), \quad (4)$$

where Z is the normalization constant of the probability, and α and β are parameters. The objective contains three terms: data fidelity ($E_t$), spatial smoothness ($E_s$), and illumination prior ($E_p$).

The data fidelity term $E_t$ measures how close the inferred illumination map $I^h$ is to the illumination component of each of the warped HDR candidate $\psi_j(D^j)$, where $D^j$ is the illumination component of the $j^{th}$ HDR candidate from the database and $\psi_j(\bullet)$ is the $j^{th}$ pixel-to-pixel warping correspondence. The distance measure is denoted by ϕ, an approximation to the L1 norm, and $\phi(x)=\sqrt{x^2+\epsilon}$, where ϵ denotes the approximation residue. The data fidelity term may be calculated using Equation (5).

$$E_t(L_i^h)=\Sigma_{j=1}^{K} w_i^j [\phi(L_i^h-\psi_j(D_i^j))+\gamma[\phi(\nabla_x L_i^h-\psi_j(\nabla_x D_i^j))+\phi(\nabla_y L_i^h-\psi_j(\nabla_y D_i^j))]] \quad (5)$$

In Equation (5), $w_i^j$ is a confidence measure of the accuracy of the $j^{th}$ candidate's warped illumination at pixel i, defined as follows $$w_i^j=(1+e^{(\|S_i-\psi_j(T_i^j)\|-\mu_s)/\sigma_s})^{-1}, \quad (6)$$

where $S_i$ is the SIFT feature vectors at pixel i in the LDR input image and $T_i^j$ is the SIFT feature vectors at pixel i in the $j^{th}$ HDR candidate image. Further, $\mu_s$ denotes mean value of a Gaussian distribution, and $\sigma_s$ denotes standard deviation of a Gaussian distribution.

The data fidelity term defined in Equation (5) measures not only absolute differences between the inferred illumination, and also relative illumination changes, i.e., illumination gradients ($\nabla_x$ and $\nabla_y$ are spatial derivatives). The latter term in Equation (5) enforce similarity among candidate illumination gradients and inferred illumination gradients, weighted by γ.

The spatial smooth term $E_s$ enforces spatial smoothness in those over exposure regions and their neighborhood, which may be defined as $$E_s(L_i^h)=\phi(\nabla_x L_i^h)+\phi(\nabla_y L_i^h). \quad (7)$$

Figure 7:
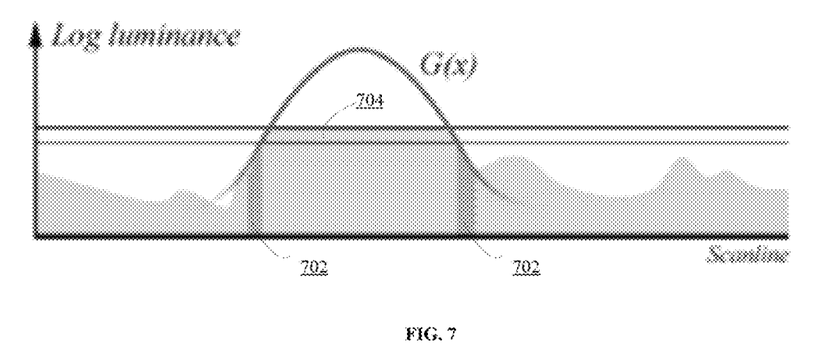
FIG. 7 illustrates an exemplary Gaussian fitting process consistent with the disclosed embodiments.

Further, assumptions from the database that may guide the inference may be incorporated when pixels have little or no influence from other terms (due to weights $w_i^j$):

$$E_p(L_i^h)=\phi(L_i^h-P_i), \quad (8)$$

where the prior P is computed by interpolation from a linear combination of elliptical Gaussian kernels. FIG. 7 illustrates an exemplary 2D Gaussian fitting process consistent with the disclosed embodiments.

As shown in FIG. 7, two well-illuminated pixel regions 702 in the left and right neighboring sides of the over-exposed region 704 may be used to estimate the Gaussian kernel. For example, pixels in region 704 may be identified as over-exposure pixels with clipped luminance information. The luminance values of pixels in region 704 may be reconstructed and interpolated using a Gaussian kernel.

In some embodiments, a 2D Gaussian kernel may be described as $$L(x,y) = A \cdot \exp\left(-\left(\frac{(x-\mu_x)^2}{2\sigma_x^2} + \frac{(y-\mu_y)^2}{2\sigma_y^2}\right)\right).$$

Assume G(x,y) denotes the regions 702 around the over-exposed regions, the Gaussian kernel may be estimated by the following optimization: $\min_{A,\mu_x,\mu_y,\sigma_x,\sigma_y}(G(x,y)-L(x,y))^2$. That is, L(x,y) obtained from the optimization procedure may be used as the reconstructed and interpolated values in the over-exposed region 704.

It should be noted that FIG. 7 illustrates a 2D Gaussian fitting example. The same principle may be used in 3D Gaussian fitting. In an exemplary embodiment, the reconstruction and interpolation of the over-exposed region may be completed using a 3D Gaussian fitting kernel.

Returning to FIG. 4, in some embodiments, iteratively reweighted least squares (IRLS) with fast convergence property may be implemented to minimize the unconstrained, non-linear optimization in equation (4).

After recovering the saturated information of the over-exposure region, inverse tone mapping techniques may be applied to expand the illumination range to become consistent with the physical property of the HDR display.

In some embodiments, by setting parameter α and β to be zero, the solution of the global optimization may be degraded to $$L_i^h=P_i, \quad (9)$$

implying that just the illumination prior by Gaussian kernel fitting needs to be computed. When there are multiple saturated regions, the Gaussian kernel fitting may be performed for each region. This approximation may significantly decrease the computation in estimating the illumination component. This approximation may be applied when there is limited computation power.

For reconstructing the texture component (S4106), constrained texture synthesis techniques may be implemented to recover the missing texture in the over-exposure regions. The texton of the over-exposure region may be obtained by sampling patches from the HDR candidate images, according to the correspondence estimated by SIFT flow. For example, a patch may include a pixel in the candidate images corresponding with the input LDR image and 8 or 15 pixels surrounding such pixel. The patch may be sampled to obtain its texture-related properties using preset functions. For the $i^{th}$ over exposure pixel in the LDR input image $I^l$, its corresponding pixel index in the $j^{th}$ HDR candidate image $D^j$ could be found by $D^j(\psi_j^{-1}(i))$. Further, a region around this pixel is sampled to obtain the texton. Texton, as used herein, may refer to representative texture patches with associated local geometric and photometric properties.

The reconstructed illumination component and reconstructed texture component are combined to produce the output HDR image (S412).

Figure 8:
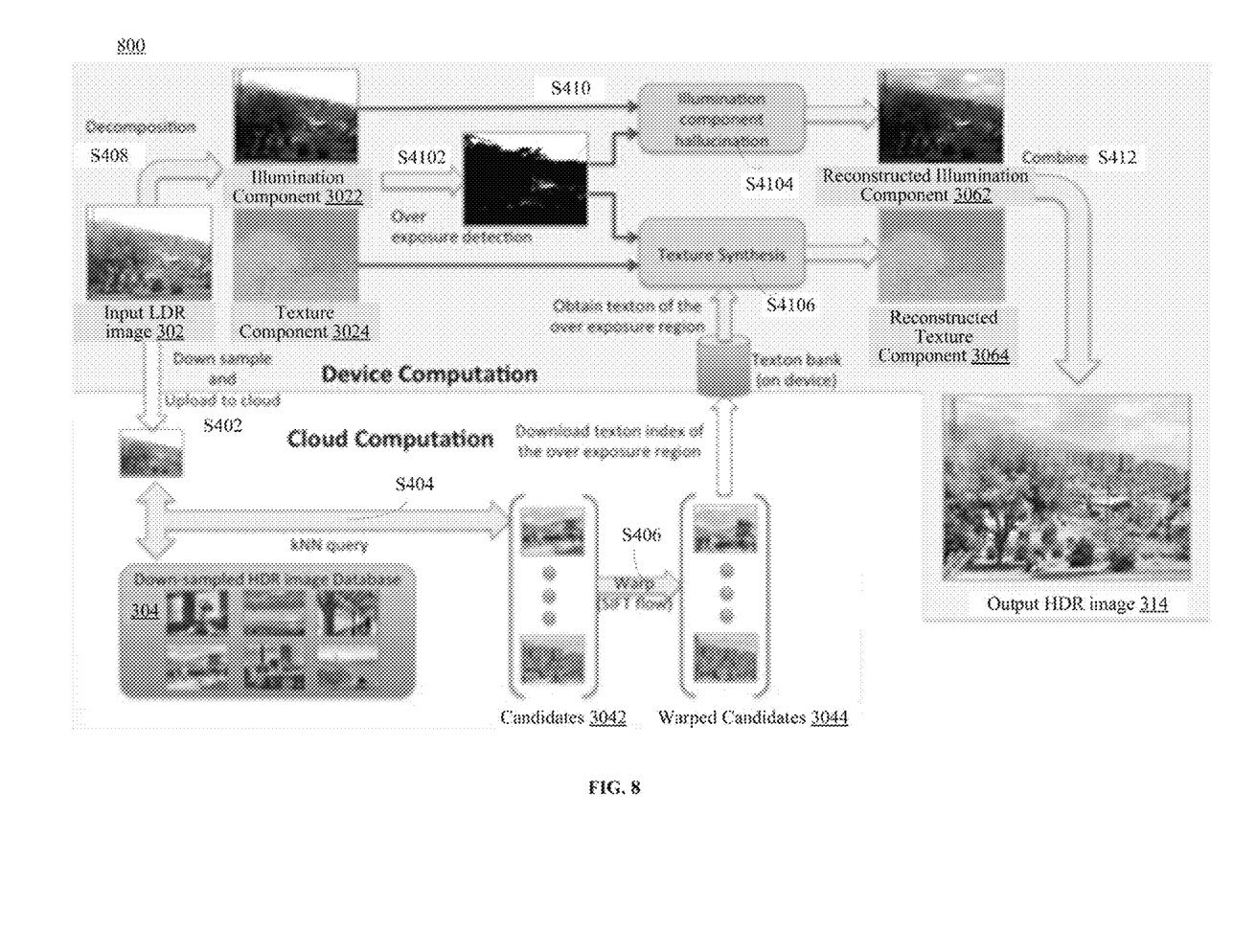
FIG. 8 illustrates an exemplary pipeline for converting an LDR image to an HDR image consistent with the disclosed embodiments.

The disclosed process 400 may be implemented on a terminal (e.g., terminal 102) and/or a server (e.g., server 104 or server 106 in cloud 110) depending on computation capabilities and speed preferences. FIG. 8 is an exemplary pipeline for converting an LDR image to an HDR image consistent with the disclosed embodiments.

As shown in FIG. 8, a computation complexity adaptive approach may be applied during the converting process. Some steps may be performed by device computation (e.g., on terminal 102, or on server 104), and other steps may be performed by cloud computation (e.g., on server 106 in cloud 110).

Cloud computation may speed up the HDR candidate image retrieval (e.g., step S404) and SIFT flow estimation process (e.g., step S406). By moving the computation of image retrieval and SIFT flow warping from a device to the cloud, the process speed may be greatly improved since the cloud usually has better computation resources than the device. Further, the HDR image database 304 may be stored on the cloud, thus updating the database may become convenient.

Data transmission from device to the cloud may also be decreased by down sampling the input LDR image by factor M. The down sample process might lose some details. However, the structure of images is usually kept in smaller scale. Thus, reasonable texton of the over-exposure region may still be obtained. The down sample factor M may be chosen adaptively based on the computation power of the cloud and data transmission speed between device and cloud.

In the exemplary pipeline 800, the input LDR image 302 may be obtained and down sampled by factor M. The down-sampled image may be uploaded to the cloud (S402). Further, the images in the HDR image database 304 may be down-sampled correspondingly. In some embodiments, each HDR image in the database may be down sampled with different scale factors and stored at multiple resolutions. The top $K^{th}$ most similar candidates 3042 in the down-sampled HDR database may be retrieved (S404) as candidate HDR images. The candidate images may be warped to match the structure of the input LDR image on the cloud (S406).

The LDR input image 302 may be decomposed to illumination component 3022 and texture component 3024 on the device (S408). The illumination component 3022 and the texture component 3024 may be reconstructed respectively based on the warped candidates 3044 (S410). Over-exposure region may be detected illumination component hallucination and texture synthesis (S4102). In some embodiments, illumination prior (e.g., from Equation 8) may be directly used as the reconstructed illumination component 3062 (S4104).

For the texture component, to speed up the texton transmission from the cloud to the device, a texton bank may be stored on both the device and the cloud. Each texton stored in the texton bank may have a corresponding texton index. The cloud may provide an index of the desired texton for the over-exposure region to the device. Texton patches may be clustered into N clusters. After the SIFT flow warping on the cloud, the desired texton index may be transferred to the device. According to the texton bank on device, the desired texton patches are fetched and utilized when synthesizing the reconstructed texture component 3064 (S4106).

Further, the reconstructed illumination and texture components are combined to produce the output HDR image 314 and displayed on the device (S412). In the pipeline 800, data transmissions between the cloud and the device may include two operations: uploading a down-sampled input LDR image from the device to the cloud, and downloading a texton index of the over-exposure region from the cloud to the device. The computation complexity may be adaptive to the computation power of the cloud and the device.

Figure 9:
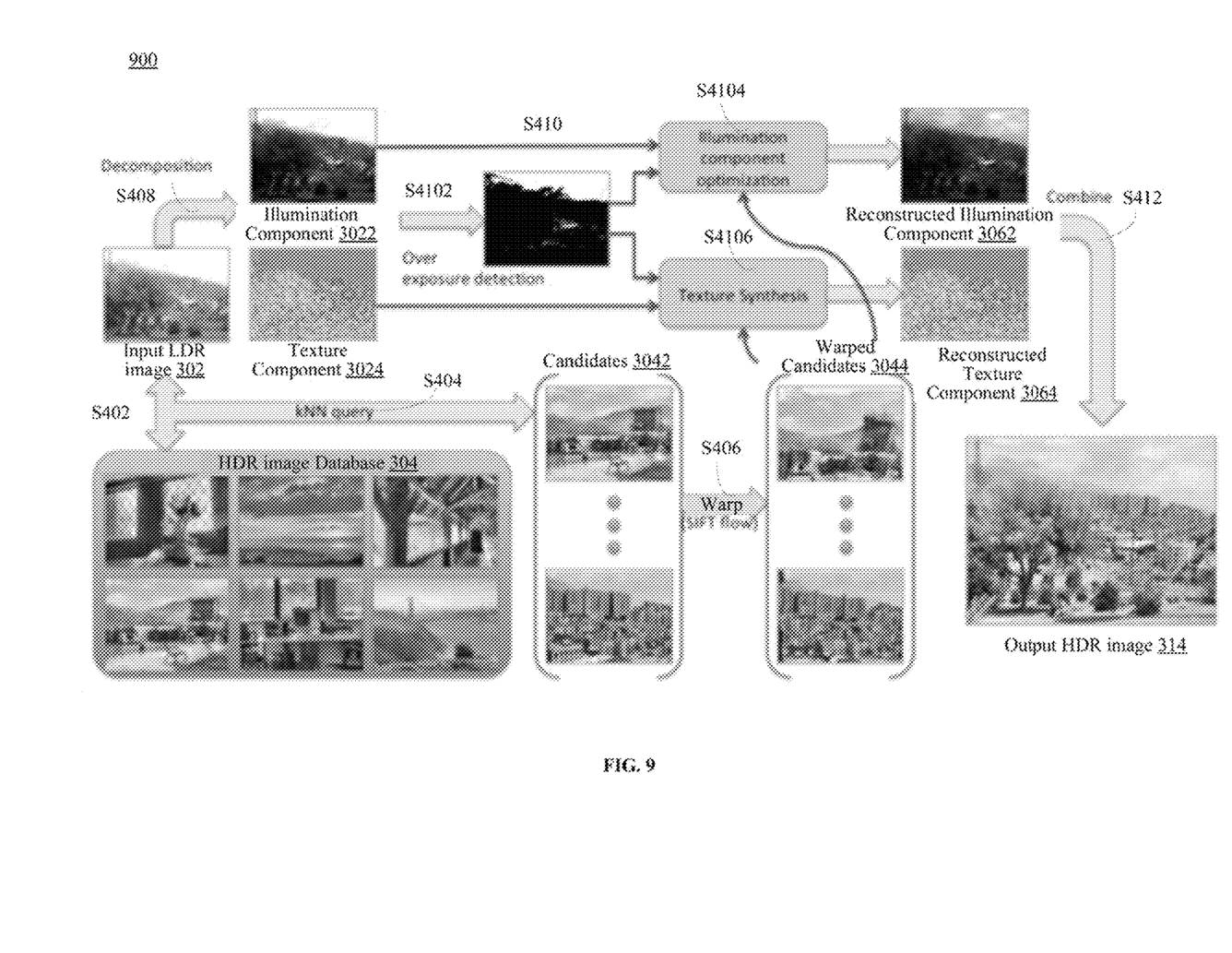
FIG. 9 illustrates another exemplary pipeline for converting an LDR image to an HDR image consistent with the disclosed embodiments.

When the computation speed is not a primary concern or the device has strong computation power, all computations in the image converting process may be implemented on one device (e.g., terminal 102 or server 104). FIG. 9 illustrates another exemplary pipeline for converting an LDR image to an HDR image consistent with the disclosed embodiments.

As shown in FIG. 9, a computational expensive approach may be applied during the converting process. The HDR candidate image retrieval (e.g., step S404) and SIFT flow estimation process (e.g., step S406) may be implemented at the original scale of the image. In the exemplary pipeline 900, given an input LDR image 302, the top $K^{th}$ most similar candidates 3042 in the HDR image database 304 may be retrieved as candidate images (S404). The candidate images may be warped to match the structure of the input image on the device (S406).

The LDR input image 302 is decomposed to illumination component 3022 and texture component 3024 on the device (S408). The illumination component 3022 and the texture component 3024 may be reconstructed respectively based on the warped candidates 3044 (S410). Over-exposure region may be detected illumination component hallucination and texture synthesis (S4102). In some embodiments, a global optimization procedure may be implemented by interpolating the warped candidates 3044 (e.g., according to Equation (3)) to produce illumination information in the over-exposure region (S4104). For the texture component, exemplar based texture synthesis may be applied to fill the texture in the over/under exposure regions (S4106). Further, the reconstructed illumination component 3062 and the reconstructed texture component 3064 are combined to produce the output HDR image 314 (S412).

By using the disclosed methods and systems, an LDR images may be converted to an HDR images based on an HDR image database with adaptive computation complexity. The HDR image database may provide guidance in reconstructing both illumination component and texture component of the saturated over exposure region in the input LDR image. Given an input LDR image, image retrieval and SIFT flow scene registration techniques may be applied to select similar HDR images from the database and find their spatial correspondence to the input image. Texture synthesis and global optimization may be implemented to recover the texture component and illumination component of the input image, respectively. With the cloud computation implementations and multi-scale image processing procedure, the computation complexity is thus flexible.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A method for converting a low dynamic range (LDR) image to a high dynamic range (HDR) image, comprising:
    obtaining an input LDR image;
    in an HDR image database, selecting one or more HDR images that match the input LDR image as candidate images;
    warping the candidate images according to a spatial correspondence between the candidate images and the input LDR image;
    decomposing the input LDR image to an illumination component and a texture component;
    respectively reconstructing the illumination component and the texture component based on the warped candidate images; and
    combining the reconstructed illumination component and the reconstructed texture component to produce an output HDR image.

2. The method according to claim 1, wherein selecting one or more HDR images that matches the input LDR image as candidate images further comprises:
calculating one or more image features of the input LDR image, wherein the one or more image features are dynamic range independent;
calculating the one or more features of the HDR images in the HDR image database; and
comparing the calculated one or more features of the input LDR image and the calculated one or more features of the HDR images to find top K matching HDR images as the candidate images, wherein K is an integer.

3. The method according to claim 1, wherein warping the candidate images according to a spatial correspondence between the candidate images and the input LDR image further comprises:
degrading one of the candidate images to an LDR image;
estimating a warping function through scale-invariant feature transform (SIFT) flow scene registration between the input LDR image and the degraded candidate image; and
warping the degraded candidate image using the warping function through SIFT flow scene registration to achieve dense scene alignment.

4. The method according to claim 3, wherein:
provided that x denotes pixel index, $I^l$ denotes the input LDR image, and $I_i^h$ denotes an $i^{th}$ candidate image,
an exposure time $\Delta t$ is used when degrading one of the candidate images to an LDR image; and
the exposure time $\Delta t$ of the $i^{th}$ candidate image is obtained by $\Delta t_i = \text{median}_x(I^l(x)/I_i^h(x))$.

5. The method according to claim 1, wherein respectively reconstructing the illumination component and the texture component based on the warped candidate images further comprises:
solving a global optimization problem to recover illumination information in the over-exposure regions based on the warped candidate images with at least one of a data fidelity term, a spatial smooth term and an illumination prior term.

6. The method according to claim 1, wherein respectively reconstructing the illumination component and the texture component based on the warped candidate images further comprises:
computing an illumination prior term by a Gaussian kernel fitting to recover illumination information in each over-exposure region.

7. The method according to claim 1, wherein respectively reconstructing the illumination component and the texture component based on the warped candidate images further comprises:
for a pixel in the over-exposure regions, finding corresponding pixels in the warped candidate images; and
sampling around the corresponding pixels to obtain a texton for texture synthesis of the pixel.

8. The method according to claim 1, wherein:
the HDR image database is stored on a cloud server;
the input LDR image is obtained by a user device and uploaded to the cloud server; and
the step of selecting one or more HDR images that matches the input LDR image as candidate images and the step of warping the candidate images according to a spatial correspondence between the candidate images and the input LDR image are performed on the cloud server.

9. The method according to claim 8, wherein:
the input LDR image is down-sampled before uploading to the cloud server; and
a plurality of HDR images in the HDR image database are down-sampled with different scale factors and stored at multiple resolutions.

10. The method according to claim 8, wherein:
a texton bank is saved on both the user device and the cloud server;
the cloud server identifies texton index of pixels in the warped candidate images and send to the user device; and
the user device obtains the identified texton index of pixels in the warped candidate images for texture synthesis of corresponding pixels in the texture component.

11. A system for converting a low dynamic range (LDR) image to a high dynamic range (HDR) image, comprising:
an HDR image database including a plurality of HDR images; and
one or more processors configured to:
obtain an input LDR image;
select, from the HDR image database, one or more HDR images that match the input LDR image as candidate images;
warp the candidate images according to a spatial correspondence between the candidate images and the input LDR image;
decompose the input LDR image to an illumination component and a texture component;
respectively reconstruct the illumination component and the texture component based on the warped candidate images; and
combine the reconstructed illumination component and the reconstructed texture component to produce an output HDR image.

12. The system according to claim 11, wherein the one or more processor is further configured to:
calculate one or more image features of the input LDR image, wherein the one or more image features are dynamic range independent;
calculate the one or more features of the HDR images in the HDR image database; and
compare the calculated one or more features of the input LDR image and the calculated one or more features of the HDR images to find top K matching HDR images as the candidate images, wherein K is an integer.

13. The system according to claim 11, wherein when warping the candidate images according to a spatial correspondence between the candidate images and the input LDR image, the one or more processor is further configured to:
degrade one of the candidate images to an LDR image;
estimate a warping function through scale-invariant feature transform (SIFT) flow scene registration between the input LDR image and the degraded candidate image; and
warp the degraded candidate image using the warping function through SIFT flow scene registration.

14. The system according to claim 13, wherein:
provided that x denotes pixel index, $I^l$ denotes the input LDR image, and $I_i^h$ denotes an $i^{th}$ candidate image,
an exposure time $\Delta t$ is used when degrading one of the candidate images to an LDR image; and
the exposure time $\Delta t$ of the $i^{th}$ candidate image is obtained by $\Delta t_i = \text{median}_x(I^l(x)/I_i^h(x))$.

15. The system according to claim 14, wherein when reconstructing the illumination component, the one or more processor is further configured to:

solve a global optimization problem recover illumination information in the over-exposure regions based on the warped candidate images, wherein the global optimization problem includes at least one of a data fidelity term, a spatial smooth term and an illumination prior term.

16. The system according to claim 14, wherein the one or more processor is further configured to:

compute an illumination prior term by a Gaussian kernel fitting to recover illumination information in each over-exposure region.

17. The system according to claim 14, wherein when reconstructing the texture component, the one or more processor is further configured to:

for a pixel in the over-exposure regions, finding corresponding pixels in the warped candidate images; and sampling around the corresponding pixels to obtain a texton for texture synthesis of the pixel.

18. The system according to claim 14, wherein:

the HDR image database is stored on a cloud server;

the one or more processors include at least one processor on a user device and at least one processor on the cloud server;

the input LDR image is obtained by a user device and uploaded to the cloud server; and the at least one processor on the cloud server is configured to select one or more HDR images that matches the input LDR image as candidate images and warp the candidate images according to a spatial correspondence between the candidate images and the input LDR image.

19. The system according to claim 18, wherein:

the input LDR image is down-sampled by the at least one processor on the user device before uploading to the cloud server; and a plurality of HDR images in the HDR image database are down-sampled with different scale factors by the at least one processor on the cloud server and stored at multiple resolutions on the cloud server.

20. The system according to claim 18, wherein:

a texton bank is saved on both the user device and the cloud server;

the at least one processor on the cloud server identifies texton index of pixels in the warped candidate images and send to the user device; and the at least one processor on the user device obtains the identified texton index of pixels in the warped candidate images for texture synthesis of corresponding pixels in the texture component.

* * * * *